(12) United States Patent
Kwag et al.

(10) Patent No.: US 8,242,204 B2
(45) Date of Patent: Aug. 14, 2012

(54) ORGANIC-INORGANIC NANO COMPOSITES AND PREPARATION METHOD THEREOF

(75) Inventors: Gwanghoon Kwag, Daejeon (KR); Hoochae Kim, Daejeon (KR); Seunghwon Lee, Daejeon (KR); Hwieon Park, Daejeon (KR); Hyung Kyu Choi, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 264 days.

(21) Appl. No.: 12/608,717

(22) Filed: Oct. 29, 2009

(65) Prior Publication Data
US 2010/0184922 A1 Jul. 22, 2010

(30) Foreign Application Priority Data
Nov. 3, 2008 (KR) .................... 10-2008-0108468

(51) Int. Cl.
C08L 33/06 (2006.01)
B60C 1/00 (2006.01)

(52) U.S. Cl. ........ 524/560; 524/556; 524/492; 525/302; 525/308

(58) Field of Classification Search .......... 525/302, 525/308; 524/556, 560, 572, 575, 577, 578, 524/579, 580
See application file for complete search history.

(56) References Cited

U.S. PATENT DOCUMENTS

| | | | |
|---|---|---|---|
| 3,563,946 A | 2/1971 | Miller et al. | |
| 3,575,913 A | 4/1971 | Meier | |
| 4,064,081 A | 12/1977 | McCoy et al. | |
| 5,274,027 A | 12/1993 | Guillaume et al. | |
| 5,302,655 A | 4/1994 | Guillaume et al. | |
| 5,395,891 A | 3/1995 | Obrecht et al. | |
| 6,127,488 A | 10/2000 | Obrecht et al. | |
| 6,780,937 B2 * | 8/2004 | Castner | 525/193 |
| 2003/0119946 A1 * | 6/2003 | Chen et al. | 523/334 |
| 2006/0141150 A1 * | 6/2006 | Zheng et al. | 427/213.3 |
| 2006/0281841 A1 * | 12/2006 | Weller et al. | 524/261 |
| 2007/0167555 A1 * | 7/2007 | Amino et al. | 524/495 |

* cited by examiner

Primary Examiner — Vickey Nerangis
Assistant Examiner — Wenwen Cai
(74) Attorney, Agent, or Firm — Frommer Lawrence & Haug LLP; Ronald R. Santucci

(57) ABSTRACT

Provided is an organic-inorganic nano composite, and more particularly, an organic-inorganic nano composite which is a product formed by the reaction of a styrene-butadiene copolymer; an acryl-based monomer; a living radical polymerization initiator; silica; and a coupling agent, in which radiality is maximized. The organic-inorganic nano composite has excellent tensile and tear properties, and high wet fraction capability. Thus, if the organic-inorganic nano composite according to the present invention is applied to organic filler for tires, rolling resistance can be decreased and wet traction capability can be increased, and the organic-inorganic nano composite can be efficiently applied to a hard coating material as well.

6 Claims, 5 Drawing Sheets

ORGANIC-INORGANIC NANO COMPOSITES AND PREPARATION METHOD THEREOF

CROSS-REFERENCE TO RELATED APPLICATION

This application claims under 35 U.S.C. §119(a) the benefit of Korean Patent Application No. 10-2008-0108468 filed Nov. 3, 2008, the entire contents of which are incorporated herein by reference.

BACKGROUND

1. Field of the Invention

The present invention relates to an organic-inorganic nano composite comprising a styrene-butadiene copolymer, an acryl-based monomer, a living radical polymerization initiator, silica, and a coupling agent. The organic-inorganic nano composite is prepared using a method comprising: preparing a spherical styrene-butadiene copolymer; preparing a nano-sized spherical styrene-butadiene-acrylate copolymer using living radical polymerization of the spherical styrene-butadiene copolymer and an acryl-based monomer; and preparing a composite by coupling the nano-sized spherical styrene-butadiene-acrylate copolymer and silica.

2. Background Art

Typically, styrene-butadiene copolymers or styrene-butadiene-acrylate copolymers are prepared using emulsion copolymerization. These copolymers are used for tires, coating materials, toners, or the like. Various methods of preparing styrene-butadiene copolymers or styrene-butadiene-acrylate copolymers by emulsion copolymerization have been reported. For example, U.S. Pat. Nos. 3,575,913 and 3,563,946 disclose a styrene-butadiene or styrene-butadiene-acrylate copolymer prepared by emulsion polymerization using potassium persulfate or azobis iso-butyronitrile. U.S. Pat. No. 4,064,081 discloses a method of preparing a butadiene-styrene-itaconic acid copolymer by emulsion polymerization using potassium persulfate as a polymerization initiator. U.S. Pat. Nos. 5,274,027 and 5,302,655 disclose methods of preparing a styrene-butadiene-acrylate copolymer by emulsion polymerization using itaconic acid and methyl methacrylate as acrylate-based compounds and ammonium persulfate as an initiator are used. In addition, U.S. Pat. Nos. 5,395,891 and 6,127,488 disclose methods of preparing cross-linked polybutadiene or styrene-butadiene copolymer by emulsion polymerization for an organic filler. However, the organic filler has low tan δ and abrasion resistance.

In addition, U.S. Pat. No. 6,780,937 discloses a composite comprising 25 wt. % of a diene unit, at least 70 wt. % of an aromatic vinyl compound, and 0.1-30 wt. % of a functionalized monomer unit. Even though the composite has a glass transition temperature of 150° C. or higher and excellent wet traction capability due to a high hysteresis at a low temperature, it has too high hardness and modulus.

In the styrene-butadiene copolymers or styrene-butadiene-acrylate copolymers prepared by conventional emulsion polymerization, the distance between particles is decreased due to reactions by radicals, and the degree of cross-linkage is increased within particles. Furthermore, it is difficult to coat silica on the particles or to prepare nano composites. In particular, it is difficult to prepare nano-sized spherical copolymers and silica nano composites.

Thus, there is still a need for the development of a novel composite to be used in the manufacture of conventional tires to improve their properties.

SUMMARY OF THE INVENTION

The present inventors conducted research to overcome the problems associated with organic-inorganic nano composites prepared by conventional emulsion polymerization. As a result, the present inventors have found an organic-inorganic nano composite prepared using a method comprising: preparing a nano-sized spherical styrene-butadiene-acrylate copolymer by introducing a polar group to the styrene-butadiene-acrylate copolymer and minimizing gel formation during the preparation of the styrene-butadiene-acrylate copolymer using living radical polymerization; and coupling the nano-sized spherical styrene-butadiene-acrylate copolymer and silica using an organic silane compound having a functional group as a coupling agent in order to improve compatibility between the copolymer and silica. Thus, the present invention provides an organic-inorganic nano composite in which a styrene-butadiene-acrylate copolymer and silica are coupled in the form of an aurora, and a method of preparing the organic-inorganic nano composite.

According to an aspect of the present invention, there is provided an organic-inorganic nano composite including: a styrene-butadiene copolymer; an acryl-based monomer represented by Formula 1 below; a living radical polymerization initiator; silica; and a coupling agent;

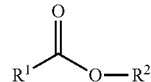

Formula 1 wherein $R^1$ is a $C_2$-$C_4$ alkenyl group, and $R^2$ is a $C_1$-$C_{12}$ alkyl group or a hydrogen atom.

According to another aspect of the present invention, there is provided a method of preparing an organic-inorganic nano composite, the method comprising:

preparing a spherical styrene-butadiene copolymer;

preparing a nano-sized spherical styrene-butadiene-acrylate copolymer using living radical polymerization of the spherical styrene-butadiene copolymer and an acryl-based monomer represented by Formula 1 below; and preparing a composite by coupling the nano-sized spherical styrene-butadiene-acrylate copolymer and silica using a coupling agent,

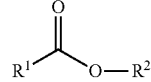

Formula 1 wherein $R^1$ is a $C_2$-$C_4$ alkenyl group, and $R^2$ is a $C_1$-$C_{12}$ alkyl group or a hydrogen atom.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
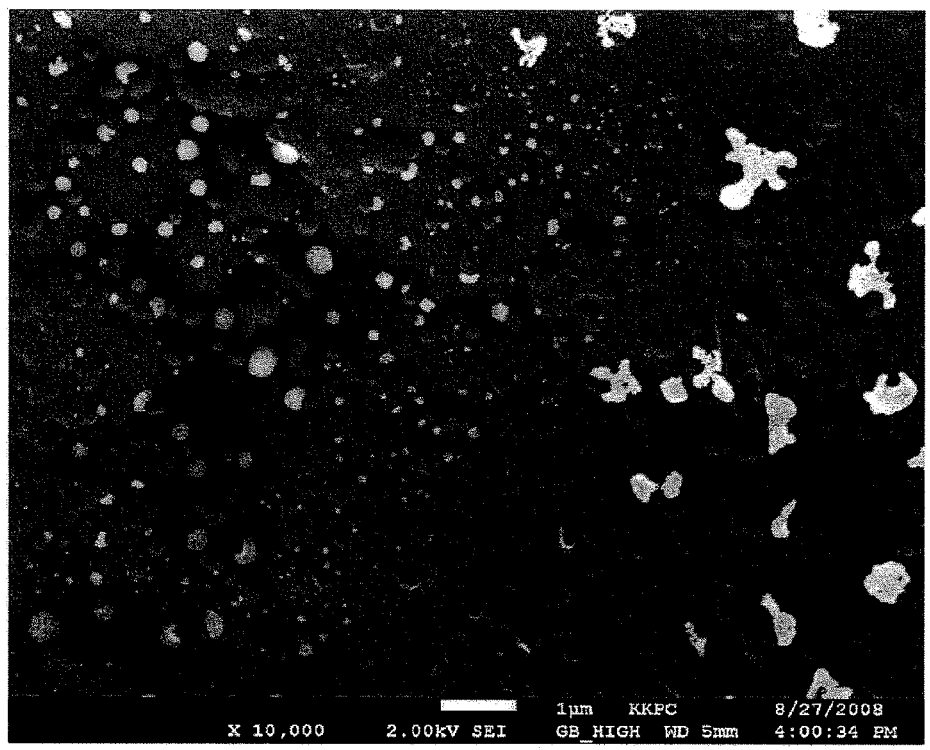
FIG. 1 is a field emission-scanning electron microscope (FE-SEM) image of a styrene-butadiene-acrylate copolymer prepared according to Example 1.

The present invention will now be described more fully with reference to the accompanying drawings, in which exemplary embodiments of the invention are shown.

The present invention provides an organic-inorganic nano composite, in which a styrene-butadiene-acrylate copolymer and silica are coupled in the form of an aurora. The organic-inorganic nano composite includes: a styrene-butadiene copolymer; an acryl-based monomer represented by Formula 1 below; a living radical polymerization initiator; silica; and a coupling agent.

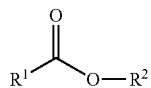

Formula 1

In Formula 1, $R^1$ is a $C_2$-$C_4$ alkenyl group, and $R^2$ is a $C_1$-$C_{12}$ alkyl group or a hydrogen atom, and preferably a linear or branched $C_1$-$C_{12}$ alkyl group.

The styrene-butadiene copolymer contained in the organic-inorganic nano composite may comprise: a styrene-based monomer; a butadiene-based monomer; a radical initiator; an emulsifier; and a mercaptan-based molecular weight modifier.

In this regard, the styrene-based monomer may comprise at least one selected from the group consisting of styrene, monochlorostyrene, methylstyrene, and dimethylstyrene. The butadiene-based monomer may comprise at least one selected from the group consisting of 1,3-butadiene, chlorobutadiene and isoprene.

Any radical initiator that is commonly used in the art may be used. The radical initiator may comprise at least one selected from the group consisting of a persulfate initiator such as potassium persulfate and ammonium persulfate, acetylacetone peroxide, benzyl peroxide, dicumylperoxide, 2,4-dichlorobenzyl peroxide, t-butyl peracetate, 2,2'-azobis(isobutylamidine)dihydrochloride, azobis isobutyronitrile, hydrogen peroxide, redox initiation systems, and initiation systems generally used in emulsion polymerization.

The emulsifier may be anionic, cationic, and nonionic surfactants. The emulsifier may comprise at least one selected from the group consisting of a metal salt and an ammonium salt; preferably at least one selected from the group consisting of alkylsulfate metal salt, alkylallylsulfonic acid metal salt, alkylphosphate metal salt, alkylsulfate ammonium salt, alkylallylsulfonic acid ammonium salt, alkylarylsulfonic acid ammonium salt, allylsulfonic acid ammonium salt, and alkylphosphate ammonium salt; more preferably at least one selected from the group consisting of dodecylbenzene sulfonic acid, lauryl sulfonic acid, and hexadecyl sulfonic acid. In this regard, each of the alkyl, allyl, and aryl radicals may have 5 to 20 carbon atoms. If the number of carbon atoms is less than 5, micelles may be formed. If the number of carbon atoms is greater than 20, hydrophilic properties may be decreased. Thus, it is preferred that the number of carbon atoms contained in the alkyl, allyl, and aryl radicals be maintained in the range described above.

In addition, the mercaptan-based molecular weight modifier used for the preparation of the styrene-butadiene copolymer may be a thiol having 8 to 20 carbon atoms, and preferably include at least one selected from the group consisting of octane thiol, decane thiol, dedecane thiol, and hexadecane thiol. An average molecular weight of the styrene-butadiene copolymer may be regulated by controlling the amount of the mercaptan-based molecular weight modifier. The styrene-butadiene copolymer may have an average molecular weight ranging from about 100,000 to about 2,000,000 g/mol. If the average molecular weight of the styrene-butadiene copolymer is less than 100,000 g/mol, physical properties may be deteriorated. On the other hand, if the average molecular weight of the styrene-butadiene copolymer is greater than 2,000,000 g/mol, viscosity and strength may be increased, thereby decreasing vulcanized properties.

The acryl-based monomer contained in the organic-inorganic nano composite is represented by Formula 1 above, in which $R^2$ is a $C_1$-$C_{12}$ alkyl group or a hydrogen atom, and preferably a linear or branched $C_1$-$C_{12}$ alkyl group. In particular, the acryl-based monomer may comprise at least one acidic or ester acrylate compound. In this regard, the acrylate compound may comprise at least one selected from the group consisting of methyl acrylate, ethyl acrylate, n-butyl acrylate, isobutyl acrylate, dodecyl acrylate, 2-ethylhexyl acrylate, itaconic acid, citraconic acid, maleic acid, and fumaric acid. The methacrylate compounds may comprise at least one selected from the group consisting of methyl methacrylate, ethyl methacrylate, and n-butyl methacrylate.

The living radical polymerization initiator contained in the organic-inorganic nano composite introduces a polar group for living radical polymerization used in the manufacture of the styrene-butadiene-acrylate copolymer and minimizes gel formation. The living radical polymerization initiator may comprise at least one selected from the group consisting of an atom transfer radical polymerization (ATRP) living radical polymerization initiator, a nitroxide-mediated polymerization (NMP) living radical polymerization initiator, and a reversible addition-fragmentation (RAFT) living radical polymerization initiator, and preferably the RAFT living radical polymerization initiator. The RAFT living radical polymerization initiator may comprise at least one selected from the group consisting of S-(3-triethoxysilylpropyl)-S'-benzyl trithiocarbonate, S,S'-bis($\alpha,\alpha'$-dimethyl-$\alpha''$-acetic acid)-trithiocarbonate, S-1-dodecyl-S'-($\alpha,\alpha'$-dimethyl-$\alpha''$-acetic acid)-trithiocarbonate, 2-phenylpropylphenyldithioacetate, and 2-(ethylthiocarbonothioylthio)-2-methyl-propanoic acid.

The silica contained in the organic-inorganic nano composite is used for reinforcing effects and hysteresis (tan δ) effects. The silica may comprise at least one selected from the group consisting of fumed silica, fused silica, silica gel, and precipitated silica.

The coupling agent contained in the organic-inorganic nano composite may be an organic silane compound having a functional group in order to improve compatibility between the styrene-butadiene-acrylate copolymer and silica. The coupling agent may be a $C_4$-$C_{25}$ alkoxy silane having an amine or vinyl functional group, and preferably include at least one selected from the group consisting of 3-aminopropyltrimethoxysilane, 3-aminopropyltriethoxysilane, N-(6-aminohexyl)aminopropyl-trimethoxysilane, 4-aminobutyltriethoxysilane, 2-(trimethoxysilyl)ethyl-2-pyridine, N[3-(triethoxysilyl)propyl]-4,5-dihydroimidazole, N,N'-(dimethylaminopropyl)-trimethoxysilane, N,N'-(diethyl-3-aminopropyl)-trimethoxysilane, 3-acryloxypropyltrimethoxysilane, vinyldimethylethoxysilane, vinyltrimethoxysilane, vinyltriethoxysilane, vinyl tri-t-butoxysilane, vinyl triphenoxysilane, vinyltriisobutoxysilane, n-hexyltrimethoxysilane, n-octadecyltriethoxysilane, n-octadecyltrimethoxysilane, 3-mercaptopropyltrimethoxysilane, 3-mercaptopropyltriethoxysilane, 3-glycidoxypropyltrimethoxysilane, and (3-glycidoxypropyl)methyldiethoxysilane.

The composition ratio of the compounds contained in the organic-inorganic nano composite is as follows.

The organic-inorganic nano composite may comprise: 1 to 50 parts by weight of the acryl-based monomer represented by Formula 1; 0.1 to 3 parts by weight of the living radical polymerization initiator; 10 to 50 parts by weight of the silica; and 1 to 5 parts by weight of the coupling agent, based on 100 parts by weight of styrene-butadiene copolymer.

The styrene-butadiene copolymer contained in the organic-inorganic nano composite may comprise: 10 to 50 wt. % of a styrene-based monomer; 49 to 89 wt. % of a butadiene-based monomer; 0.05 to 3 wt. % of a radical initiator; 0.1 to 5 wt. % of an emulsifier; and 0.001 to 2 wt. % of a mercaptan-based molecular weight modifier. In this regard, if the amount of the styrene-based monomer is less than 10 wt. % based on the total weight of the styrene-butadiene copolymer, mechanical properties such as tensile properties may be deteriorated. If the amount of the styrene-based monomer is greater than 50 wt. % based on the total weight of the styrene-butadiene copolymer, elasticity and abrasion resistance may be decreased. If the amount of the butadiene-based monomer is less than 49 wt. %, elasticity and abrasion resistance may be decreased. If the amount of the butadiene-based monomer is greater than 89 wt. %, mechanical properties such as tensile properties may be deteriorated. Thus, it is preferred that the amounts of the styrene-based monomer and the butadiene-based monomer be maintained in the range described above.

In addition, if the amount of the radical initiator is less than 0.05 wt. %, polymerization may not be sufficiently performed. If the amount of the radical initiator is greater than 3 wt. %, the molecular weight of the radical initiator may be too low. If the amount of the emulsifier is less than 0.1 wt. %, micelles may not be formed. If the amount of the emulsifier is greater than 5 wt. %, micro emulsion may be formed so that the molecular weight of the emulsifier may be too low. Thus, it is preferred that the amounts of the radical initiator and the emulsifier be maintained in the range described above.

In addition, the molecular weight of the styrene-butadiene copolymer may be regulated by controlling the amount of the mercaptan-based molecular weight modifier. If the amount of the mercaptan-based molecular weight modifier is in the range of 0.0001 to 0.1 wt. %, a styrene-butadiene copolymer having a high molecular weight may be prepared. On the other hand, if the amount of the mercaptan-based molecular weight modifier is in the range of 0.5 to 2 wt. %, a styrene-butadiene copolymer having a low molecular weight may be prepared. However, if the amount of the mercaptan-based molecular weight modifier is less than 0.0001 wt. %, gel may be formed. If the amount of the mercaptan-based molecular weight modifier is greater than 2 wt. %, physical properties may be deteriorated.

The amount of the acryl-based monomer may be in the range of 1 to 50 parts by weight, and preferably 10 to 30 parts by weight based on 100 parts by weight of the styrene-butadiene copolymer. If the amount of the acryl-based monomer is less than 1 part by weight, hydrophilic properties of the styrene-butadiene-acrylate copolymer may not be sufficiently expressed. If the amount of the acryl-based monomer is greater than 50 parts by weight, elasticity may be decreased and strength may be increased, thereby decreasing vulcanized properties.

In addition, the amount of the living radical polymerization initiator may be in the range of 0.1 to 3 parts by weight, and preferably 0.1 to 1 parts by weight based on 100 parts by weight of the styrene-butadiene copolymer. If the amount of the living radical polymerization initiator is less than 0.1 parts by weight, ultra high molecular weight compounds may be formed. If the amount of the living radical polymerization initiator is greater than 3 parts by weight, a large amount of low molecular weight compounds may be formed. The amount of the silica may be in the range of 10 to 50 parts by weight, and preferably 20 to 40 parts by weight based on 100 parts by weight of the styrene-butadiene copolymer. If the amount of the silica is less than 10 parts by weight, the reinforcing effects of the silica may be decreased. If the amount of the silica is greater than 50 parts by weight, silica may be precipitated during the preparation of the styrene-butadiene copolymer. In addition, the amount of the coupling agent may be in the range of 1 to 5 parts by weight, and preferably 1 to 3 parts by weight based on 100 parts by weight of the styrene-butadiene copolymer. If the amount of the coupling agent is less than 1 part by weight, the styrene-butadiene-acrylate copolymer and the silica may not be appropriately coupled. If the amount of the coupling agent is greater than 5 parts by weight, the manufacturing cost may be increased.

Hereinafter, a method of preparing an organic-inorganic nano composite according to the present invention will be described.

[Method of Preparing Organic-inorganic Nano Composite]

A method of preparing the organic-inorganic nano composite according to the present invention includes:

preparing a spherical styrene-butadiene copolymer;

preparing a nano-sized spherical styrene-butadiene-acrylate copolymer by living radical polymerization of the spherical styrene-butadiene copolymer and an acryl-based monomer represented by Formula 1 below; and preparing a composite by coupling the nano-sized spherical styrene-butadiene-acrylate copolymer and silica using a coupling agent,

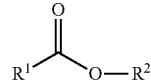

Formula 1 wherein $R^1$ is a $C_2$-$C_4$ alkenyl group, and $R^2$ is a $C_1$-$C_{12}$ alkyl group or a hydrogen atom, and preferably a linear or branched $C_1$-$C_{12}$ alkyl group.

The compounds used in the preparation method and the composition ratio of the compounds are described above. The operations of the method will be described in more detail.

In the first step, a styrene-butadiene copolymer having an average molecular weight of 100,000 to 2,000,000 g/mol is prepared by emulsion polymerization at a temperature ranging from 10 to 70° C. for about 5 to about 20 hours. As described above, the molecular weight of the styrene-butadiene copolymer varies depending on the amount of the mercaptan-based molecular weight modifier, and thus a high molecular weight or low molecular weight styrene-butadiene copolymer may be prepared. The high molecular weight styrene-butadiene copolymer may be prepared for high elasticity and excellent mechanical properties, and the low molecular weight styrene-butadiene copolymer may be prepared to improve vulcanized properties. When the styrene-butadiene copolymer is prepared at a temperature less than 10° C., the emulsion polymerization may not be appropriately activated. When the styrene-butadiene copolymer is prepared at a temperature greater than 70° C., physical properties of the copolymer may not be maintained.

In the second step, the styrene-butadiene copolymer prepared according to the first operation is mixed with an acryl-based monomer represented by Formula 1. Then, the mixture is subjected to living radical polymerization at a temperature ranging from 20 to 90° C. by adding a living radical polymerization initiator to the mixture to prepare a styrene-butadiene-acrylate copolymer. When the styrene-butadiene-acrylate copolymer is prepared at a temperature less than 20° C., the living radical polymerization may not be appropriately activated. When the styrene-butadiene-acrylate copolymer is prepared at a temperature greater than 90° C., intrinsic physical properties of the copolymer may not be maintained since heat generated by the polymerization is not appropriately controlled. Thus, the living radical polymerization may be conducted within the temperature range described above. A polymerization time depends on a polymerization temperature, and the living radical polymerization may be conducted for about 5 to about 20 hours. The living radical polymerization may be atom transfer radical polymerization (ATRP) living radical polymerization, nitroxide-mediated polymerization (NMP) living radical polymerization, and reversible addition-fragmentation (RAFT) living radical polymerization, and preferably RAFT living radical polymerization. The RAFT living radical polymerization has excellent reactivity in the polymerization of polar molecules even under aqueous media. By the RAFT living radical polymerization, molecular weight and molecular structure may be controlled, a polar group may be introduced, and gel formation may be minimized. The styrene-butadiene-acrylate copolymer has a nano-sized spherical shape and has a particle diameter of 20 to 200 nm. If the particle diameter of the styrene-butadiene-acrylate copolymer is less than 20 nm, microemulsion is formed with low molecular weight. If the particle diameter of the styrene-butadiene-acrylate copolymer is greater than 200 nm, gel and clots may be formed. Furthermore, the prepared styrene-butadiene-acrylate copolymer has an average molecular weight of about 100,000 to 3,000,000 g/mol. If the average molecular weight of the styrene-butadiene-acrylate copolymer is less than 100,000 g/mol, physical properties of the copolymer may be deteriorated. On the other hand, if the average molecular weight of the styrene-butadiene-acrylate copolymer is greater than 3,000,000 g/mol, a gel may be formed and vulcanized properties may be deteriorated due to high hardness.

In the third step, the coupling agent used may be an organic silane compound having an amine or vinyl functional group in order to increase compatibility and affinity between the styrene-butadiene-acrylate copolymer prepared in the second step and silica, and examples of the coupling agent are described above. The organic-inorganic nano composite prepared is subjected to a post-treatment, agglomerated using a conventional agglomeration method while sufficiently stirring the composite using a stirrer, filtered, and dried to prepare white or yellow powder.

The present invention will be described in greater detail with reference to the following examples. The following examples are for illustrative purposes and are not intended to limit the scope of the invention.

EXAMPLES

Synthesis of RAFT Living Radical Polymerization Initiator

1) Preparation of Benzyl Dithioacetate 1 g of Bromomethyl benzene was dissolved with 20 mL of tetrahydrofuran, 1.5 g of sodium methylthiocarbonate dissolved in tetrahydrofuran was added thereto, and the mixture was stirred at room temperature for 12 hours. 100 mL of water was added to the mixture. The resultant mixture was subjected to extraction using ethyl ether, and dried using magnesium sulfate to prepare benzyl dithioacetate.

$^1$H NMR (CDCl$_3$): δ 2.91 (SCH$_3$), 4.48 (benzyl CH$_2$), 7.38 (ArH)

2) Preparation of Benzyl Ethoxydithioformate 1 g of Ethanol was dissolved in 50 g of dimethylforamide, 0.44 g of sodium hydride (60% paraffin) was added thereto, and the mixture was stirred for 4 hours. 1.8 mL of carbon disulfide was gradually added thereto, and the mixture was stirred for 12 hours. 1.3 mL of benzylbromide was gradually added to the mixture and the resultant was stirred at room temperature for 12 hours. Then, the reaction was terminated by adding 1 mL of methanol thereto. Ice was added to the resultant, and the resultant was subjected to extraction using ethyl ether and dried using magnesium sulfate to prepare benzyl methoxydithiomate.

$^1$H NMR (CDCl$_3$): δ 1.51 (CH$_3$), 4.52 (CH$_2$), 4.55 (benzyl CH$_2$), 7.34 (ArH).

Preparation of Organic-inorganic Nano Composite

Example 1

Figure 2:
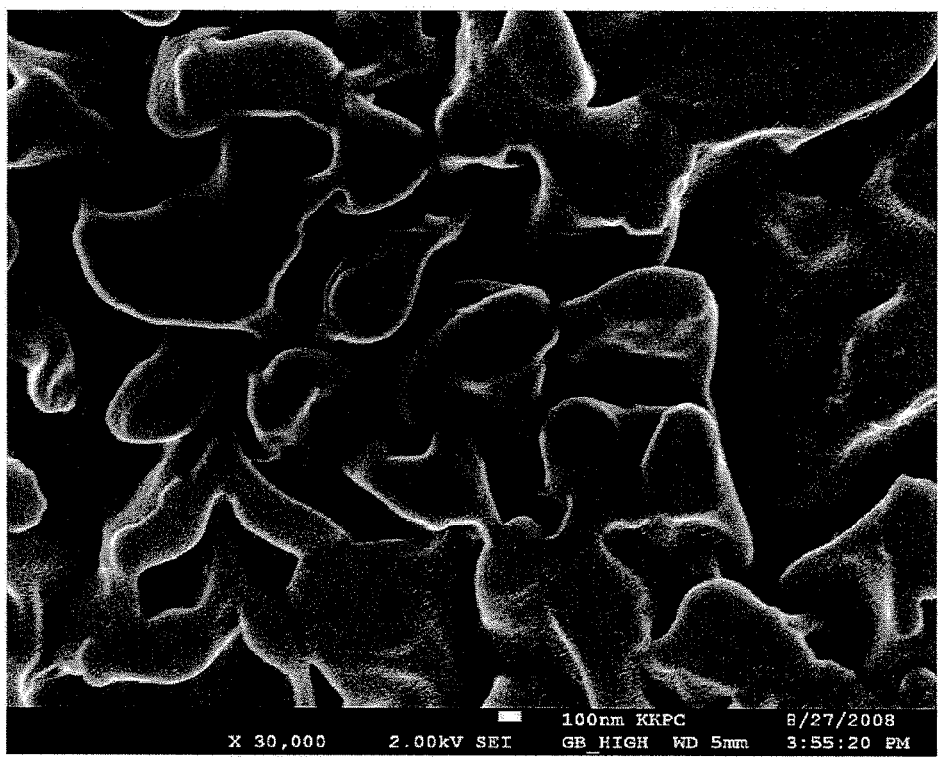
FIG. 2 is a FE-SEM image of an organic-inorganic nano composite prepared according to Example 1.
Figure 3:
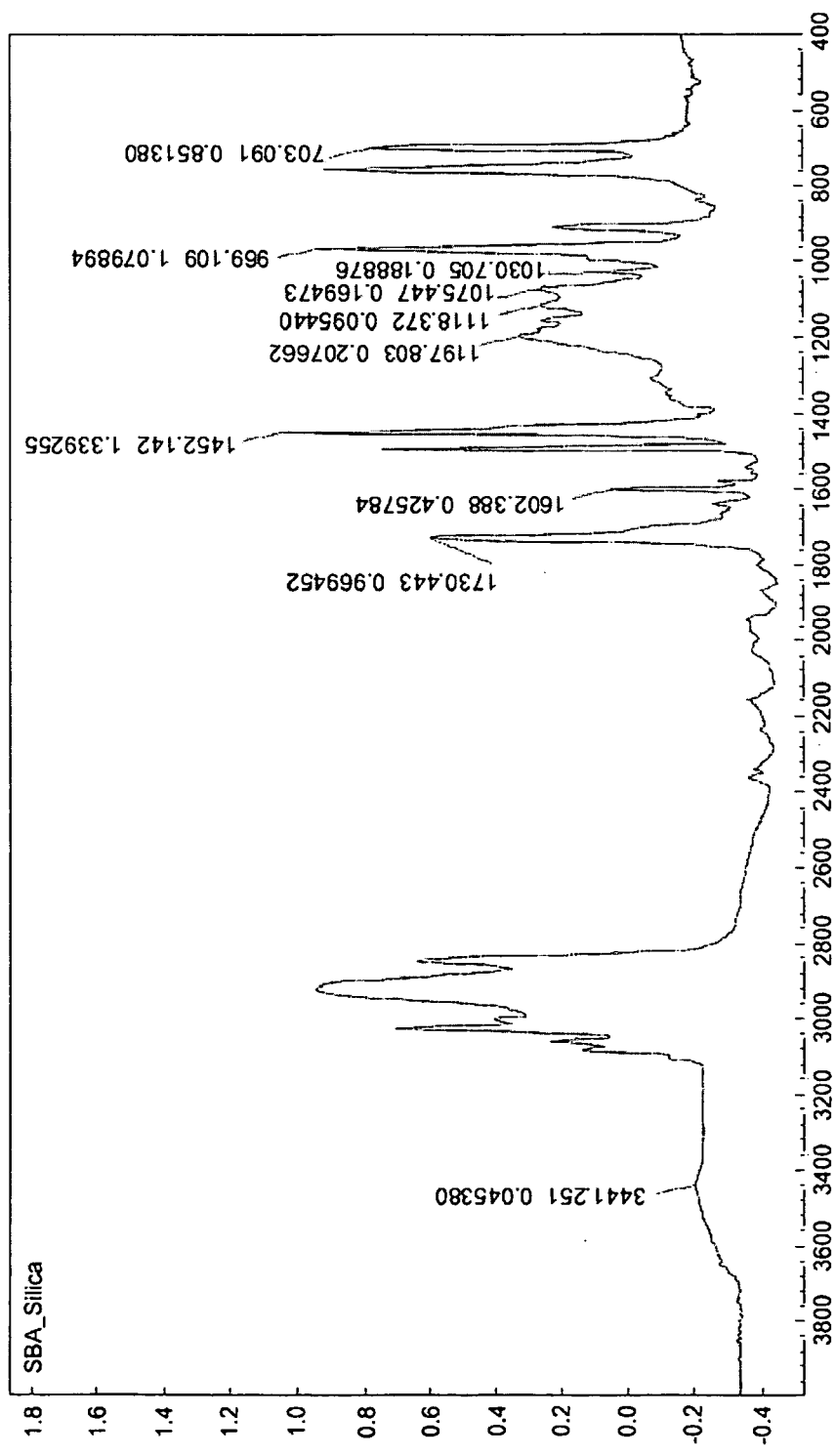
FIG. 3 is a graph illustrating IR data of an organic-inorganic nano composite prepared according to Example 1 obtained using an infrared (IR) spectrometer.
Figure 4:
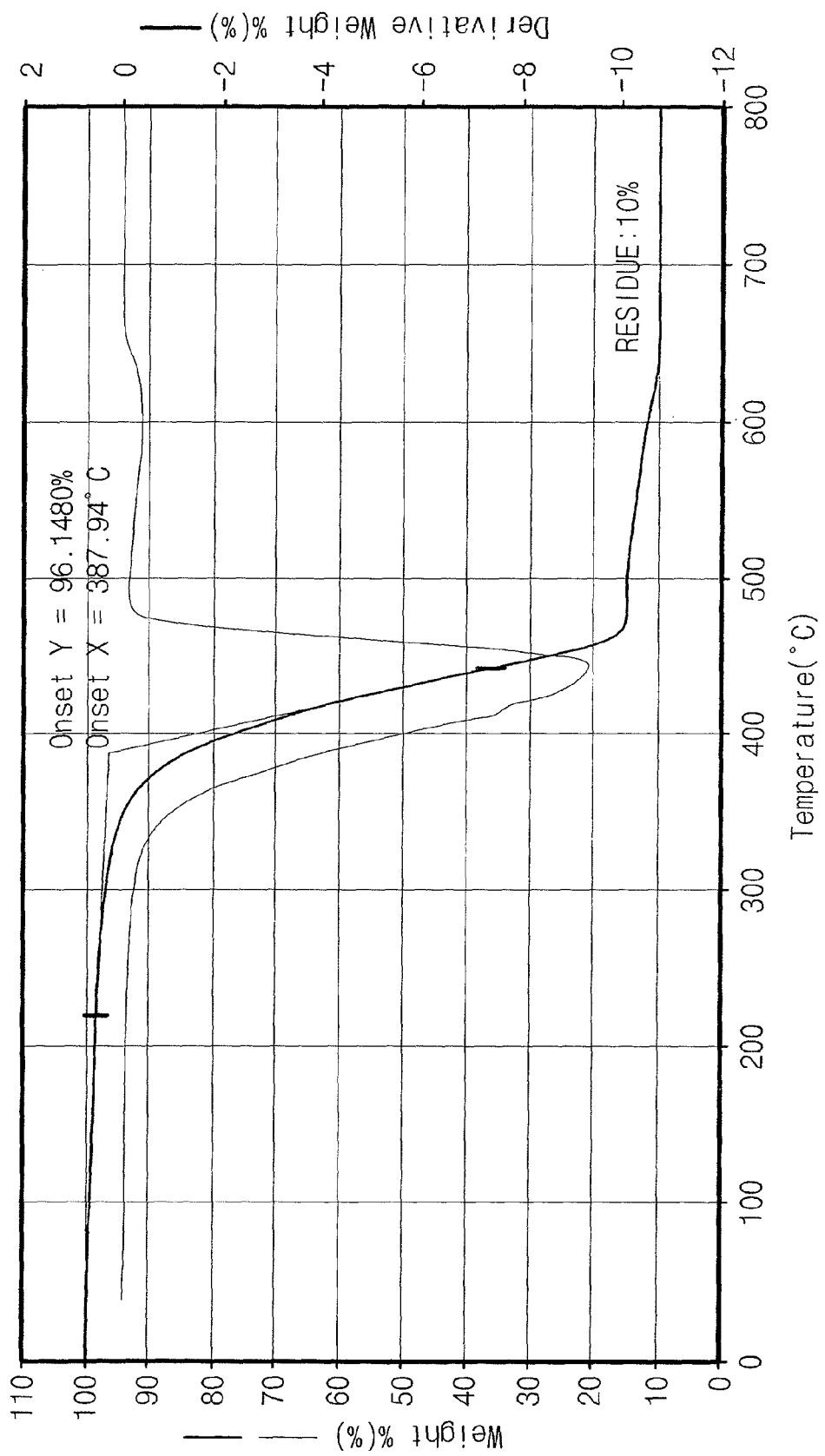
FIG. 4 is a graph illustrating a thermogravimetric analysis (TGA) data of an organic-inorganic nano composite prepared according to Example 1.

400 mL of Water, 2 g of sodium dodecyl sulfate salt, 80 g of styrene, 200 g of 1,3-butadiene, 0.02 g of n-dodecyl mercaptan, and 2 g of potassium persulfate were continuously added to a 5 L pressure reactor at 30° C. while stirring for 24 hours to prepare a styrene-butadiene copolymer having an average molecular weight of 245,000 g/mol. Then, 0.6 g of benzyl dithioacetate RAFT living radical polymerization initiator prepared above, 0.2 g of potassium persulfate, 40 g of methyl methacrylate, and 200 mL of water were added thereto. The mixture was subjected to living radical polymerization while stirring for 24 hours to prepare a spherical styrene-butadiene-acrylate copolymer having an average molecular weight of 273,000 g/mol and an average particle diameter of 30 to 300 nm. A field emission-scanning electron microscope (FE-SEM) image of the styrene-butadiene-acrylate copolymer is shown in FIG. 1. 6 g of 3-Aminopropyltrimethoxysilane was added to the pressure reactor including the styrene-butadiene-acrylate copolymer, and the mixture was stirred. Then, 100 g of precipitated silica was added thereto, and the mixture was stirred at 80° C. for 12 hours. Steam was applied to the resultant for 1 hour to obtain clotted product. The organic-inorganic nano composite was identified using FE-SEM (FIG. 2), infrared (IR) spectrometer (FIG. 3), and thermogravimetric analysis (TGA) (FIG. 4). The composition ratio of the compounds used in Example 1 is shown in Table 1 below.

In addition, the FE-SEM image (model: JEOL JSM-7500F, 2 kV, secondary electron image) was measured by dropping one or two droplets of a solution obtained by diluting a latex sample in water to a concentration of about 0.1% on a glass plate, drying the droplets in an oven at 60° C. for 1 hour, coating the dried droplets with gold using a sputtering coater.

Example 2

400 mL of Water, 2 g of sodium dodecyl sulfate salt, 80 g of styrene, 200 g of 1,3-butadiene, 0.02 g of n-dodecyl mercaptan, and 2 g of potassium persulfate were continuously added to a 5 L pressure reactor at 50° C. while stirring for 24 hours to prepare a styrene-butadiene copolymer having an average molecular weight of 236,000 g/mol. Then, 0.6 g of benzyl dithioacetate RAFT living radical polymerization initiator (in 10% $CH_2Cl_2$) prepared above, 0.2 g of potassium persulfate, 40 g of methyl methacrylate, and 200 mL of water were added thereto. The mixture was subjected to living radical polymerization while stirring for 24 hours to prepare a spherical styrene-butadiene-acrylate copolymer having an average molecular weight of 259,000 g/mol and an average particle diameter of 30 to 300 nm. Then, 6.0 g of 3-aminopropyltrimethoxysilane was added to the pressure reactor including the styrene-butadiene-acrylate copolymer, and the mixture was stirred at 80° C. for 12 hours. 100 g of precipitated silica was added thereto, and the mixture was stirred for 12 hours. Then, steam was applied thereto for 1 hour to obtain agglomerated product.

Examples 3 to 5

Organic-inorganic nano composites according to Examples 3 to 5 were prepared in the same manner as in Example 1, except that compounds and the composition ratios of the organic-inorganic nano composite shown in Table 1 were used.

TABLE 1

| Classification | | | Example 1 | Example 2 | Example 3 | Example 4 | Example 5 |
|---|---|---|---|---|---|---|---|
| Styrene-butadiene copolymer | styrene-based monomer | styrene | | 28.6 (wt. %) | | | 27 (wt. %) |
| | butadiene-based monomer | 1,3-butadiene | | 69.993 (wt. %) | | | 71.46 (wt. %) |
| | radical initiator | potassium persulfate | | 0.7 (wt. %) | | | 0.5 (wt. %) |
| | emulsifier | sodium dodecyl sulfate salt | | 0.7 (wt. %) | | | 1.0 (wt. %) |
| | Mercaptan-based molecular weight modifier | n-dodecyl mercaptan | | 0.007 (wt. %) | | | 0.04 (wt. %) |
| | Total | | | 100 wt. % | | | |
| Acryl-based monomer | methyl methacrylate | | 14.3 (parts by weight) | 14.3 (parts by weight) | 28.6 (parts by weight) | — | 20.0 (parts by weight) |
| | acrylic acid | | — | — | — | 25.0 (parts by weight) | — |
| Living radical polymerization initiator | benzyl dithioacetate | | 0.2 (parts by weight) | — | 1.5 (parts by weight) | 1 (parts by weight) | 0.5 (parts by weight) |
| | benzyl ethoxydithioformate | | — | 0.2 (parts by weight) | — | — | — |
| Silica | precipitated silica | | 35.7 (parts by weight) | 35.7 (parts by weight) | 35.7 (parts by weight) | 35.7 (parts by weight) | 35.7 (parts by weight) |
| Coupling agent | 3-aminopropyltrimethoxysilane | | 2.1 (parts by weight) | 2.1 (parts by weight) | 2.1 (parts by weight) | 2.1 (parts by weight) | 2.1 (parts by weight) |

1) styrene: Kumho Petrochemical Co., Ltd.
2) 1,3 butadiene: Kumho Petrochemical Co., Ltd.
3) sodium dodecyl sulfate salt: Aldrich
4) methyl methacrylate: Aldrich
5) acrylic acid: Aldrich
6) precipitated silica: Zeosil 175
7) 3-aminopropyltrimethoxysilane: Gelest

Comparative Example 1

Figure 5:
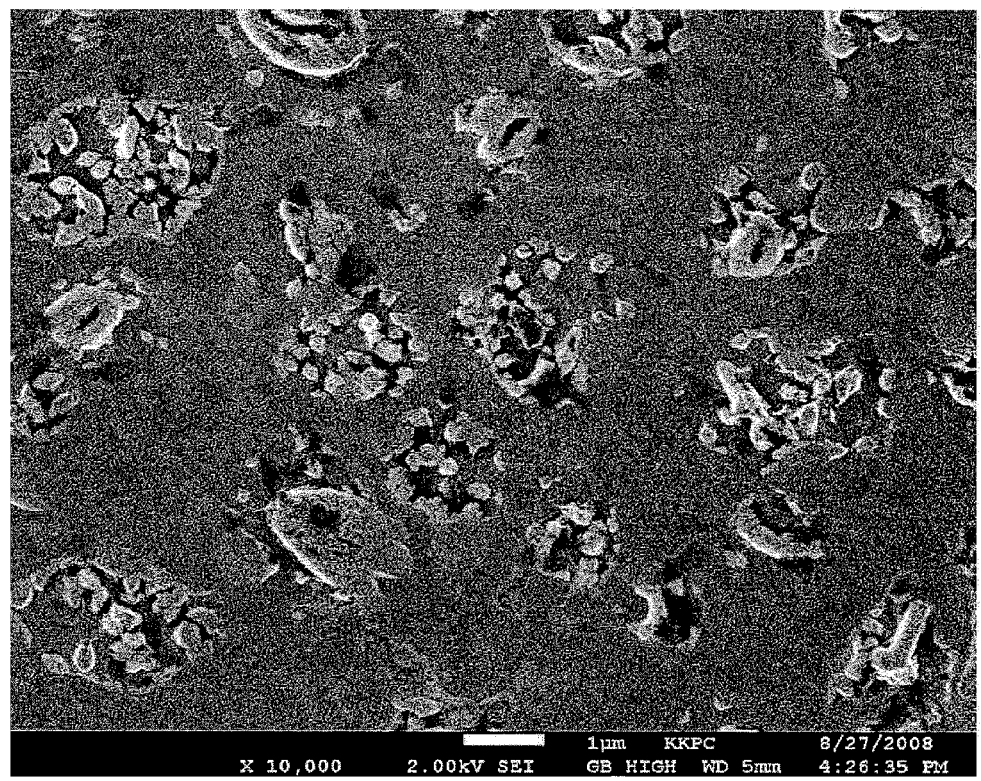
FIG. 5 is a FE-SEM image of a composite of a styrene-butadiene-acrylate copolymer and silica prepared according to Comparative Example 1.

Preparation of Organic-Inorganic Composite without Performing RAFT Living Radical Polymerization 400 mL of water, 2 g of sodium dodecyl sulfate salt, 80 g of styrene, 200 g of 1,3-butadiene, 40 g of methamethylacrylate, 0.02 g of n-dodecyl mercaptan, and 2 g of potassium persulfate were continuously added to a 5 L pressure reactor at 50° C. while stirring for 24 hours to prepare a styrene-butadiene-acrylate copolymer. An FE-SEM image of the styrene-butadiene-acrylate copolymer is shown in FIG. 5. 6 g of 3-aminopropyltrimethoxysilane was added to the pressure reactor including the styrene-butadiene-acrylate copolymer, and the mixture was stirred. 100 g of precipitated silica was added thereto, and the mixture was stirred at 80° C. for 12 hours. Then, steam was applied thereto for 1 hour to obtain a clotted product.

Preparation Example 1

Preparation of Tire Tread Sheet

4 Parts by weight of zinc oxide (ZnO), 2 parts by weight of stearic acid, 50 parts by weight of silica (Zeosil 175), and 4 parts by weight of a coupling agent, 15 parts by weight of a process oil, and 2 parts by weight of an antioxidant, based on 100 parts by weight of a mixture including 12 g of the organic-inorganic nano composite obtained according to Example 1, 68 g of 1,4-cis-polybutadiene (NdBR-40, Kumho Petrochemical Co., Ltd.), 27.5 g of styrene-butadiene rubber (S-SBR 6270S, Kumho Petrochemical Co., Ltd., oil content: 27.3%), were sequentially added to an internal mixer (Banbury mixer) and mixed at 120° C. at 60 rpm for 6.5 minutes to prepare a first mixture (First mixing). Then, the first mixture was cooled to 60° C. 1.5 parts by weight of sulfur, 2.5 parts by weight of a vulcanization accelerator, and the first mixture were mixed while stirring at 60° C. at 50 rpm for 3 minutes to prepare a second mixture (Second mixing). Then, the second mixture was processed to produce a flat sheet using a roll having a thickness of 2 mm and maintained for 24 hours. Vulcanization was conducted in a hot press at 160° C. under a pressure of 160 kgf/cm² or higher for 10 minutes to prepare a sheet having a thickness of 2 mm for physical property measurement.

Preparation Examples 2 to 5 and Comparative Preparation Example 1

Tire tread sheets according to Preparation Examples 2 to 5 and Comparative Preparation Example 1 were prepared in the same manner as in Preparation Example 1, except that organic-inorganic nano composites of Examples 2 to 5 and Comparative Example 1 were used instead of the organic-inorganic nano composite of Example 1.

Comparative Preparation Example 2

Preparation of Tire Tread Sheet without Using Organic-Inorganic Nano Composite

4 Parts by weight of zinc oxide (ZnO), 2 parts by weight of stearic acid, 50 parts by weight of silica (Zeosil 175), and 4 parts by weight of a coupling agent, 15 parts by weight of a process oil, and 2 parts by weight of an antioxidant, based on 100 parts by weight of a mixture including 80 g of 1,4-cis-polybutadiene (NdBR-40, Kumho Petrochemical Co., Ltd.) and 27.5 g of styrene-butadiene rubber (S-SBR 6270S, Kumho Petrochemical Co., Ltd., oil content: 27.3%), were sequentially added to an internal mixer (Banbury mixer) and mixed at 120° C. at 60 rpm for 6.5 minutes to prepare a first mixture (First mixing). Then, the first mixture was cooled to 60° C. 1.5 parts by weight of sulfur, 2.5 parts by weight of a vulcanization accelerator, and the first mixture were mixed while stirring at 60° C. at 50 rpm for 3 minutes to prepare a second mixture (Second mixing). Then, the second mixture was processed to produce a flat sheet using a roll having a thickness of 2 mm and maintained for 24 hours. Vulcanization was conducted in a hot press at 160° C. under a pressure of 160 kgf/cm² or higher for 10 minutes to prepare a sheet having a thickness of 2 mm for physical property measurement.

Experimental Example

Measuring Physical Properties

Physical properties of the samples prepared according to Preparation Examples 1 to 5 and Comparative Preparation Examples 1 and 2 were measured, and the results are shown in Table 2 below. In this regard, curing properties were measured using a compound Mooney viscosity, tensile property was measured using ASTM D412, abrasion was measured using DIN abrasion test, and wet traction capability was measured using hysteresis (tan δ).

TABLE 2

| Classification | | Preparation example 1 | Preparation example 2 | Preparation example 3 | Preparation example 4 | Preparation example 5 | Comparative preparation example 1 | Comparative preparation example 2 |
|---|---|---|---|---|---|---|---|---|
| Curing properties (at 160° C.) | Comp MV (100° C.) | 74.4 | 74.7 | 94.3 | 82.9 | 69.5 | 77.5 | 78.6 |
| | ML(dNm) | 4.3 | 4.4 | 5.9 | 5.0 | 4.1 | 4.5 | 3.8 |
| | MH (dNm) | 32.7 | 32.5 | 41.5 | 35.9 | 31.1 | 33.9 | 34.8 |
| | T10(160° C.) [min] | 3.8 | 3.9 | 4.0 | 3.8 | 3.7 | 3.9 | 3.9 |
| | T50(160° C.) [min] | 5.1 | 5.1 | 5.3 | 5.0 | 4.9 | 5.1 | 5.0 |
| | T90(160° C.) [min] | 7.1 | 6.9 | 7.5 | 6.9 | 6.7 | 6.9 | 6.8 |
| Press cure time (160° C., 10 min) | | | | | | | | |
| Tensile properties | Hd's (shore A) | 59 | 59 | 62 | 61 | 58 | 59 | 58 |
| | M100% (kgf/cm²) | 25.0 | 26.1 | 32.9 | 28.2 | 23.4 | 22.3 | 21.4 |
| | M200% (kgf/cm²) | 51.8 | 52.5 | 65.8 | 56.0 | 48.5 | 47.9 | 46.4 |
| | M300% (kgf/cm²) | 91.0 | 95.5 | 106.3 | 100.5 | 89.2 | 86.5 | 85.5 |
| | Tb (kgf/cm²) | 138 | 143 | 179 | 147 | 125 | 127 | 105 |
| | Elongation (%) | 402 | 398 | 327 | 355 | 419 | 377 | 344 |
| | Tear strength (kgf/cm²) | 5.6 | 5.9 | 7.8 | 6.9 | 5.9 | 4.6 | 4.3 |

TABLE 2-continued

| Classification | | Preparation example 1 | Preparation example 2 | Preparation example 3 | Preparation example 4 | Preparation example 5 | Comparative preparation example 1 | Comparative preparation example 2 |
|---|---|---|---|---|---|---|---|---|
| Abrasion | Weight loss (mg) | 120 | 121 | 110 | 115 | 125 | 134 | 133 |
| Dynamic Properties | Tg (° C.) | −66 | −65 | −52 | −55 | −54 | −65 | −69 |
| | tan δ (0° C.) | 0.110 | 0.107 | 0.119 | 0.121 | 0.119 | 0.092 | 0.083 |
| | tan δ (70° C.) | 0.049 | 0.051 | 0.052 | 0.050 | 0.048 | 0.050 | 0.046 |

Referring to Table 2, the organic-inorganic nano composites prepared according to Preparation Examples 1 to 5 of the present invention have excellent tensile and tear properties, abrasion resistance, and high wet traction capability (tan δ, at 0° C.) when compared with the organic-inorganic nano composites prepared according to Comparative Preparation Examples 1 and 2.

Therefore, the organic-inorganic nano composite according to the present invention can be efficiently applied to tires, belts, hose, paper coating, etc.

The organic-inorganic nano composite according to the present invention has excellent tensile and tear properties, and high wet traction capability by maximizing affinity between the organic polymer and silica. Thus, if the organic-inorganic nano composite according to the present invention is applied to organic filler for tires, rolling resistance can be decreased and wet traction capability can be simultaneously increased, and the organic-inorganic nano composite can be efficiently applied to a hard coating material.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic-inorganic nano composite which is a product formed by the reaction of a styrene-butadiene copolymer; an acryl-based monomer represented by Formula 1 below; a reversible-addition fragmentation (RAFT) living radical polymerization initiator; silica; and a coupling agent;

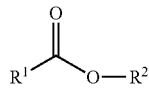

Formula 1 wherein $R^1$ is a $C_2$-$C_4$ alkenyl group, and $R^2$ is a $C_1$-$C_{12}$ alkyl group or a hydrogen atom; the composite comprises 1 to 50 parts by weight of the acryl-based monomer, 0.1 to 3 parts by weight of the living radical polymerization initiator, 10 to 50 parts by weight of the silica, and 1 to 5 parts by weight of the coupling agent, based on 100 parts by weight of the styrene-butadiene copolymer.

2. The organic-inorganic nano composite of claim 1, wherein the acryl-based monomer comprises at least one compound selected from the group consisting of:
at least one acrylate compound selected from the group consisting of methyl acrylate, ethyl acrylate, n-butyl acrylate, isobutyl acrylate, dodecyl acrylate, and 2-ethyihexyl acrylate; and
at least one methacrylate compound selected from the group consisting of methyl methacrylate, ethyl methacrylate, and n-butyl methacrylate.

3. The organic-inorganic nano composite of claim 1, wherein the living radical polymerization initiator comprises at least one reversible-addition fragmentation (RAFT) living radical polymerization initiator selected from the group consisting of S-(3-triethoxysilylpropyl)-S'-benzyl trithiocarbonate, S,S'-bis(α,α'-dimethyl-α"-acetic acid)-trithiocarbonate, S-1-dodecyl-S'-(α,α'-dimethyl-α"-acetic acid)-trithiocarbonate, 2-phenylpropylphenyldithioacetate and 2-(ethylthiocarbonothioylthio)-2-methyl-propanoic acid.

4. The organic-inorganic nano composite of claim 1, wherein the coupling agent is a $C_4$-$C_{25}$ alkoxy silane having an amine or vinyl functional group.

5. The organic-inorganic nano composite of claim 1, wherein the styrene-butadiene copolymer comprises: 10 to 50 wt. % of a styrene-based monomer; 49 to 89 wt. % of a butadiene-based monomer; 0.05 to 3 wt. % of a radical initiator; 0.1 to 5 wt. % of an emulsifier; and 0.001 to 2 wt. % of a mercaptan-based molecular weight modifier.

6. A tire comprising an organic-inorganic nano composite according to claim 1.

* * * * *